United States Patent [19]

De Castro Loureiro Barreto Rosa et al.

[11] Patent Number: 5,776,865

[45] Date of Patent: Jul. 7, 1998

[54] EMULSIFIABLE OIL

[75] Inventors: Maria Manuel De Castro Loureiro Barreto Rosa; Arend Kuindert Van Helden; Herman Mathieu Muijs, all of Amsterdam, Netherlands

[73] Assignee: Shell Oil Company, Houston, Tex.

[21] Appl. No.: 444,084

[22] Filed: May 17, 1995

[30] Foreign Application Priority Data

May 25, 1994 [EP] European Pat. Off. ............. 94201469

[51] Int. Cl.$^6$ .............................. C09K 7/00; C08G 63/00; C08G 67/02; C07G 45/00
[52] U.S. Cl. ................. 507/103; 507/100; 528/392; 528/271; 568/387; 568/399
[58] Field of Search ..................... 568/387, 399; 528/271, 392; 507/100

[56] References Cited

U.S. PATENT DOCUMENTS

| | | |
|---|---|---|
| 4,424,317 | 1/1984 | Serres et al. ............. 525/539 |
| 4,740,625 | 4/1988 | Drent .................... 568/387 |
| 4,851,582 | 7/1989 | Drent .................... 568/387 |
| 4,963,282 | 10/1990 | Jolley et al. ............. 252/67 |
| 5,021,178 | 6/1991 | Chen et al. ............. 252/32 R |
| 5,225,523 | 7/1993 | Drent et al. ............. 528/392 |

FOREIGN PATENT DOCUMENTS

| | | |
|---|---|---|
| 0 374 671 A1 | 6/1990 | European Pat. Off. . |
| 384517 A2 | 8/1990 | European Pat. Off. . |
| 0 393 790 A2 | 10/1990 | European Pat. Off. . |
| 0 512 501 A2 | 11/1992 | European Pat. Off. . |
| 0 521 650 A1 | 1/1993 | European Pat. Off. . |
| 2 251 876 | 7/1992 | United Kingdom . |

*Primary Examiner*—Joseph McKane
*Assistant Examiner*—Joseph Murray

[57] ABSTRACT

Emulsifiable oil, suitable for use as oil phase in oil-based drilling fluids, having one or more ketones with a flashpoint of at least 55° C., in particular oligoketones obtainable by co-oligomerization of carbon monoxide and olefins.

14 Claims, No Drawings

EMULSIFIABLE OIL

BACKGROUND OF THE INVENTION

The invention relates to emulsifiable oils which are suitable to be used as oil phase in oil based drilling fluids.

In the industry, drilling fluids are used in connection with the drilling of wells, in particular for the recovery of mineral oil and gas from underground formations.

The use of drilling fluids serves a number of purposes including the removal of drilled cuttings and fines, the sealing of the well bore to prevent losses of drilling fluid into the formation, the lubrication of drilling equipment, the suspension of cuttings and fines in the event of interruptions in the drilling operation and the cooling of the drill bit.

In the art drilling fluids, also indicated as drilling muds, are described whereby water serves as the continuous phase (cf. for example GB 2251876). In these water-based muds, finely divided solids are dispersed, usually together with additives such as viscosifiers, emulsifiers and stabilizers, as a suspension in the aqueous fluid.

Although the use of water-based drilling muds is attractive for economic reasons, a problem consists in that most shales through which the well is drilled are water-sensitive. By absorption of water, clay formation will occur which destabilizes the well bore and which may even result in a collapse thereof. Moreover, in the event of intermediate salt layers, significant amounts of salt will dissolve in the drilling fluid with a similar detrimental effect on the wellbore.

It is further known to use oil-based drilling fluids, also indicated as invert oil emulsion muds, whereby oil constitutes the continuous phase.

A disadvantage of oil-based drilling fluids consists in that the continuous phase, usually a mineral oil fraction, is not, or only to a minor extent biodegradable and often toxic. In particular for off-shore drilling operations, it is important to use non-toxic and readily degradable drilling fluids.

In EP 374671 oil-based drilling fluids are disclosed, whereby instead of the conventional mineral oil fractions, esters from $C_2$–$C_{12}$ monoalcohols and mono- or polyunsaturated $C_{16}$–$C_{24}$ carboxylic acids are used as the continuous phase. The biodegradability of these oil-based muds is allegedly improved, as compared to that of muds based on mineral oil fractions, but their use entails an upper temperature limit and requires also a strict control of the pH. Hydrolysis of the esters induced by a high temperature and a high pH will destroy the fluid properties of the mud. It has been proposed to neutralize any formed corrosive free acids by supplying alkaline materials, but it was observed that in order to avoid an undesirable thickening of the drilling fluid, only very limited amounts of alkaline additives can be tolerated.

SUMMARY OF THE INVENTION

Surprisingly, it has now been found that emulsifiable oils comprising specific ketones do not entail the above-mentioned stability problems and hence may very advantageously be used as oil phase in oil-based drilling fluids.

The invention may be defined as relating to an emulsifiable oil, suitable for use as oil phase or substantial part thereof, in oil-based drilling fluids, comprising one or more ketones having a flashpoint of at least 55° C.

The invention further relates to drilling fluids comprising a continuous oil phase, at least 90% by weight of which consists of the emulsifiable oil as defined and an aqueous phase dispersed therein.

DESCRIPTION OF PREFERRED EMBODIMENTS

In order to be suitable as (substantial part of) the oil phase in oil-based drilling fluids, the ketones should have a flashpoint of at least 55° C. Preferably, ketones are selected with higher flashpoints, viz. of at least 80° C. As the flashpoint of a compound is related to its molecular weight, it follows that ketones having a low molecular weight, for example methylisopropylketone, will have flashpoints below 55° C. and hence can only be tolerated in insignificant amounts relative to the ketones considered suitable in the context of the present application.

Another property of the ketones, relevant in connection with their suitability as oil phase in drilling fluids, is their pourpoint, which property is related to the structure and the molecular weight of these compounds. Preferably, ketones are selected having a pourpoint below 0° C., more preferably below –10° C. and most preferably below –20° C.

Still another characteristic property, being of relevance in connection with the envisaged use of the ketones, is their viscosity. Preferably, ketones are selected with a low viscosity, e.g. with a viscosity of 5 cSt or more and at most 20 cSt, measured at 20° C.

Ketones with viscosities in the range of 5 to 10 cSt at 20° C. are most preferred.

In view of the above-mentioned properties, it is preferred that the molecular weight of the ketones is within a certain range. As explained before, ketones with a very low molecular weight, e.g. of 100 or less, will exhibit flashpoints below 55° C., whereas high molecular ketones will be too viscous to be recommended for use as oil phase in invert emulsion drilling fluids. Preferably the molecular weight of the ketones is at least 180, most preferably ketones are selected of which the molecular weight is in the range of 250 to 1000.

As regards the biodegradability of the ketones, apparently the number of functional groups per molecule is of significance.

It is believed that especially at the positions where the functional groups are located the molecules are accessible for anaerobic or aerobic attack. Hence, the presence of more than one functional group per molecule is recommended, in order to promote the biodegradability of the compounds.

Ketones having from 2 to 5 ketogroups per molecule are in particular preferred. If desired, individual compounds may be used, but mixtures of 2 or more ketones are likewise suitable.

A category of ketones which are especially suitable to be used in drilling muds as oil phase or a substantial part thereof, i.e. at least 60% and advantageously at least 90% by weight, consists of co-oligomers of carbon monoxide and one or more olefins having from 4 to 8 carbon atoms per molecule.

Preferred are co-oligomers of carbon monoxide and $C_4$–$C_8$ olefins, whereby the units derived from carbon monoxide alternate with the units derived from the olefin(s).

Examples of suitable monomeric olefins are butene, pentene, 4-methyl-1-pentene, hexene and octene. In particular, the alpha-olefins are preferred such as butene-1 and hexene-1. Olefins with even carbon numbers are most preferred, as they are readily available as dimers, trimers or oligomers of oligomerization processes based on the "Aufbau" principle, whereby ethene is catalytically converted into higher, linear olefins.

For the preparation of the ketones of the invention, techniques may be used, known per se in the art.

According to a preferred method, in particular recommended for the preparation of the aforesaid alternating co-oligomers of carbon monoxide and one or more $C_4$–$C_8$ olefins, the monomers are contacted under polymerization conditions with a catalyst composition comprising a metal from Group VIII of the Periodic Table, a bidentate ligand of the general formula $R^1R^2$—$M^1$—R—$M^2$—$R^3R^4$ (I) wherein $M^1$ and $M^2$ independently represent a phosphorus, arsenic or antimony atom, $R^1$, $R^2$, $R^3$ and $R^4$ independently represent substituted or non-substituted aliphatic hydrocarbyl groups and R represents a bivalent organic bridging group containing at least two carbon atoms in the bridge connecting $M^1$ and $M^2$.

The catalyst composition, preferably used in this preparation method, comprises palladium as Group VIII metal. As bidentate ligand, the catalyst composition preferably comprises a ligand of formula (I), wherein $M^1$ and $M^2$ both represent a phosphorus atom, $R^1$, $R^2$, $R^3$ and $R^4$ each represent an aliphatic group in which the carbon atom linked to a phosphorus atom carries only one hydrogen atom and R represents a bivalent bridging group containing three carbon atoms in the bridge. Preferably, the catalyst composition comprises in addition an anion of an acid with a pKa of less than 4, in particular of less than 2.

An example of a particularly preferred catalyst composition is a composition comprising palladium-(II)-acetate, 1,3-bis(diiso-propylphosphino)propane and an anion of a (trihalo)methane sulphonic acid.

The preparation may be carried out in the presence of hydrogen, if so desired. The presence of hydrogen is not necessary, however, in the event that bidentate ligands with at least one secondary alkylphosphino group in their molecules are used.

Optionally, the preparation of the oligoketones may be carried out in the further presence of an alkaline compound, e.g. a ternary amine such as tributylamine or pyridine.

For further particulars in connection with the preparation of alternating oligoketones, reference is made to the patent literature, in particular to EP 522635 and EP 522643.

As mentioned above, the drilling fluids of the invention comprise a continuous phase, essentially consisting of the emulsifiable oil and an aqueous phase dispersed therein. Additionally, the drilling fluids usually comprise conventional additives, such as viscosifiers, emulsifiers, alkaline materials, salt-stabilizers and the like.

The invention is illustrated by the following examples.

EXAMPLE 1

A co-oligomer of 1-butene and carbon monoxide was prepared as follows.

A 400 ml stainless steel autoclave was charged with 0.3 mmoles of palladium-II-acetate, 0.4 mmoles of 1,3-bis(diisopropyl-phosphino)propane, 0.6 mmoles of methanesulfonic acid, 0.6 mmoles of pyridine, 60 g of 1-butene and 150 ml of methanol.

The autoclave was sealed and pressurized with 60 bar of carbon monoxide and 5 bar of hydrogen.

Subsequently, the temperature was raised to 80° C. After a reaction period of 3 h, the reaction was discontinued by cooling the contents of the autoclave to room temperature.

The yield of 1-butene/carbon monoxide co-oligomers was 40 gram.

An analysis of the product was made with the aid of gas chromatography. The selectivities are proportional to the found gas chromatographical area (GC-area) percentages.

The GC-area for the monoketones (3-vinylidene-4-octanone and 3-methyl-4-octanone) was 55%, for the diketone (3-vinylidene-6-ethyl-undeca-4,7-dione) 15%, for the triketone (3-vinylidine-6,9-diethyl-tetra-deca-4,7,10-trione) 6% and for aldehydes 6%.

The turnover (grams of product per gram of palladium and per hour) was 251.

The average molecular weight, determined by $^{13}$C NMR was 200.

From the product, 25% v lower boiling components were distilled off. The remaining product had a flashpoint of more than 55° C. and a pourpoint below –60° C.

EXAMPLE 2

A co-oligomer of 1-hexene and carbon monoxide was prepared as follows.

A 2 l autoclave was charged with a solution of 1 mmole of palladium-II-acetate, 1.2 mmoles of 1,3-bis(di-sec-butylphosphino)-propane, 2 mmoles of trifluoromethanesulfonic acid and 2 mmoles of pyridine in 90 ml of methanol, and 1600 ml of 1-hexene.

The autoclave was sealed and pressurized with 52 bar of carbon monoxide and 4 bar of hydrogen.

The temperature was raised to 85° C. and the carbon monoxide pressure was maintained at 52 bar during the reaction, but no further hydrogen was supplied.

After a reaction period of 22 hours, the contents of the autoclave were cooled to room temperature.

The 1-hexene conversion was 50%, the turnover was 267 grams of product per gram of palladium and per hour. The product had an average molecular weight ($^{13}$C NMR) of 298 and a viscosity of 10.72 cSt, measured at 20° C.

EXAMPLE 3

A co-oligomer of 1-hexene and carbon monoxide was prepared, substantially as described in Example 2.

The turnover was 272 grams of product per gram of palladium and per hour.

The product had an average molecular weight ($^{13}$C NMR) of 296 and a viscosity of 10.18 cSt.

The product combined with that obtained in Example 2 had an average molecular weight ($^{13}$C NMR) of 297, a viscosity of 10.38 cSt and a flashpoint of 91° C.

The composition of the combined product (GC-areas) was as follows:

methylheptanoate: 0.7% monoketone(5-vinylidene-dodeca-6-one): 45.2% saturated monoketone(5-methyldodeca-6-one): 3% diketone(5-vinylidene-8-butylpentadeca-6,9-dione): 19.9% triketone(5-vinylidene-8,11-dibutyloctadeca-6,9,12-trione): 9.6% tetraketones: 3.7%

EXAMPLE 4

Four batches of co-oligomers of 1-butene and carbon monoxide were prepared, substantially as described in Example 1, with the following differences:

i) the amounts of 1-butene were 130 g, 130 g, 130 g and 120 g, respectively, instead of 60 g and the amount of methanol 90 ml, instead of 150 ml;

ii) the reaction temperatures were 82° C., 82° C., 77° C. and 77° C., respectively, instead of 80° C.; and iii) the reaction periods were 24 h, 29 h, 29 h and 22 h, respectively, instead of 5.5 h.

The four products (yields 92.9 g, 100.5 g, 112.7 g and 81.2 g, respectively) were combined. The resulting blend had an average molecular weight ($^{13}$C NMR) of 227, a flashpoint of 68° C., a pourpoint below −60° C. and a viscosity of 6.40 cSt, measured at 20° C.

The composition of the blend, based on GC-area analysis was as follows:

monoketone(3-vinylidene-4-octanone): 35.5% diketone(3-vinylidene-6-ethylundeca-4,7-dione): 23.8% triketone(3-vinylidene-6,9-diethyltetradeca-4,7,10-trione): 10.6% tetraketone: 4.89%

EXAMPLE 5

An oil-based mud was prepared, substantially according to a recipe published by NL/BAROID for ester-based muds, whereby as oil phase the blend obtained in Example 4 was used.

The recipe is as follows:

To a 500 ml heater, containing 150 ml of the butene-1/carbon monoxide co-oligomer, obtained according to Example 4, 2.48 g of GELTONE II (Oil-Gelling Clay) was added.

After a 15-minute shear treatment, 7.45 g of E2 MUL NT (emulsifier and Oil-wetting Agent) was added and after a 5-minute shear treatment 4.97 g of DURATONE HT (Emulsifier and filtration Control Agent).

After a further 5-minute shear treatment, 0.62 g of OMC 42 (Oil Mud Conditions) was added and after another 5 minute shear treatment a mixture of 16.10 g of $CaCl_2.2H_2O$, 0.32 g of calcium hydroxide and 59.86 ml of distilled water was added.

After a shear treatment of 30 minutes, various properties of the resulting oil-based mud were determined.

The rheological properties were established by measuring the plastic viscosity (PV), the yield point (YP) and the apparent viscosity (AP), all measurements being made at 25° C. with a CHAN 35 viscosimeter (API methods No. 13B2 and 13D).

The emulsion stability was established by storing the mud in a graduated cylinder at 60° C. and visually determining the amount of phase separated from the mud.

The fluid loss was determined by means of the OFI filter press equipment, filtering the mud at 60° C. under 7 bar nitrogen pressure (API method No. 13B2).

The toxicity was determined by means of a MICROTOX test, being an instrumental method using freeze-dried luminescent bacteria as the bioassay organism. According to this method, $EC_{50}$ values can be calculated for water-soluble chemicals and, for water-insoluble compounds, by using the water accommodated fraction. This fraction was obtained by rolling 10 ml of the 1-butene/carbon monoxide co-oligomer blend with 90 ml of distilled water. The results of the various tests are shown in the Table.

EXAMPLE A (For Comparison, Not According to the Invention)

Two-oil based muds were prepared, according to the NL/BAROID recipe, using two esters, instead of co-oligomer blend of Example 4.

The esters were PETROFREE (available from Henkel/NL Baroid) and SURDYNE B 105 (a mixture of acetates of $C_{12}$ and $C_{13}$ alcohols, available from Shell Chemicals Company, UK).

PETROFREE has a flashpoint of 179° C., a pourpoint of −30° C. and a viscosity of 9 cSt. SURDYNE B 105 has a flashpoint of 120°–130° C., a pourpoint of −12° C. and a viscosity of 5.09 cSt.

The properties of the muds, based on these esters are shown in the Table.

TABLE

| | Drilling mud based on: | | |
|---|---|---|---|
| | Co-oligomer of 1-Butene/CO | PETROFREE Ester | SURDYNE B |
| Viscosity | | | |
| Fann reading at 600 rpm | 73 | 94 | 52 |
| idem at 300 rpm | 47 | 62 | 32 |
| PV (cP) | 26 | 32 | 20 |
| YP (lb/100 ft²) | 21 | 30 | 12 |
| AV (cP) | 37 | 47 | 26 |
| Phase Separation | | | |
| Top layer (% v/v) of total | 18 | 10 | 12 |
| Fluid Loss | | | |
| ml through filter | 2.2 | 1.4 | 2.0 |
| Toxicity | | | |
| $EC_{50}$ of oil, mg/l | 11.7 | 1900 | 17.6 |

We claim:

1. Oil-based drilling fluids comprising an oil phase, and an aqueous phase dispersed therein, and one or more drilling fluid additives wherein said oil phase or substantial part thereof comprises an emulsifiable oil consisting of at least one ketone, wherein said at least one ketone has a flashpoint of at least 55° C.

2. Drilling fluid as claimed in claim 1, wherein said at least one ketone has a flashpoint of at least 80° C.

3. Drilling fluid as claimed in claim 1, wherein said at least one ketone has a pourpoint of less than 0° C.

4. Drilling fluid as claimed in claim 3, wherein said at least one ketone has a pourpoint of less than −10° C.

5. Drilling fluid as claimed in claim 1, wherein said at least one ketone has a molecular weight of at least 180.

6. Drilling fluid as claimed in claim 5, wherein the molecular weight is in the range of 250 to 1000.

7. Drilling fluid as claimed in claim 1, wherein at least one ketone has 2 to 5 ketogroups per molecule.

8. Drilling fluid as claimed in claim 1, wherein said at least one ketone comprises one or more co-oligomers of carbon monoxide and one or more $C_4$–$C_8$ olefins.

9. Drilling fluid as claimed in claim 8, wherein said co-oligomer is an alternating co-oligomer of carbon monoxide and 1-butene.

10. Drilling fluid as claimed in claim 8, wherein said co-oligomer is an alternating co-oligomer of carbon monoxide and 1-hexene.

11. Drilling fluid as claimed in claim 8, wherein said one or more co-oligomers have been prepared by contacting carbon monoxide and one or more $C_4$–$C_8$ olefins under polymerization conditions with a catalyst composition comprising a metal from Group VII of the Periodic Table, a bidentate ligand of the general formula $R^1R^2$—$M^1$—R—$M^2$—$R^3R^4$ wherein $M^1$ and $M^2$ independently represent a phosphorus, arsenic or antimony atom, $R^1$, $R^2$, $R^3$ and $R^4$ independently represent substituted or non-substituted aliphatic hydrocarbyl groups and R represents a bivalent organic bridging group having at least two carbon atoms in the bridge connecting $M^1$ and $M^2$.

12. Drilling fluid as claimed in claim 11, wherein said catalyst comprises palladium, wherein $M^1$ and $M^2$ both represent phosphorus, $R^1$, $R^2$, $R^3$ and $R^4$ each represent an aliphatic group in which the carbon atom linked to a phosphorus atom carries one hydrogen atom, and R represents a bivalent bridging group having three carbon atoms in the bridge and additionally an anion of an acid with a pKa of less than 4.

13. Drilling fluid as claimed in claim 11, wherein said catalyst comprises palladium(II)acetate, 1,3-bis-(diisopropylphosphino)propane and an anion of an acid with a pKa of less than 2.

14. Drilling fluids as claimed in claim 1 wherein said emulsifiable oil comprise 5 to 40% by weight of an aqueous phase dispersed in the oil phase.

* * * * *